United States Patent [19]

McGarvey

[11] Patent Number: 5,222,747
[45] Date of Patent: Jun. 29, 1993

[54] FITTING WITH OVERTIGHTENING PREVENTION GASKET

[75] Inventor: Raymond McGarvey, Bethesda, Md.

[73] Assignee: General Components, Inc., Gaithersburg, Md.

[21] Appl. No.: 694,066

[22] Filed: May 1, 1991

[51] Int. Cl.$^5$ .................... F21B 33/00; F16J 19/00
[52] U.S. Cl. .................... 277/236; 277/167.5; 277/169; 277/207 A; 277/180; 285/917; 285/139
[58] Field of Search ............ 277/236, 167.5, 168, 277/169, 207 A, 180; 285/917, 80, 139, 343, 353, 354, 382, 390, 336

[56] References Cited

U.S. PATENT DOCUMENTS

| | | | |
|---|---|---|---|
| 508,765 | 11/1893 | Rouse | 277/167.5 |
| 906,761 | 12/1908 | White | 285/336 |
| 1,477,696 | 12/1923 | Dollman | 285/331 X |
| 1,819,036 | 8/1931 | Oberhuber | 285/336 |
| 1,821,865 | 9/1931 | Wilson | 277/180 |
| 1,821,866 | 9/1931 | Wilson | 277/180 X |
| 2,789,844 | 4/1957 | Kessler | 285/336 |
| 3,208,758 | 9/1965 | Carlson et al. | 277/171 |
| 3,239,245 | 3/1966 | Press et al. | 285/354 X |
| 3,302,953 | 2/1967 | Glasgow | 277/180 |
| 3,521,910 | 7/1970 | Callahan, Jr. et al. | 285/422 X |
| 3,561,793 | 2/1971 | Rode | 285/13 |
| 3,578,346 | 5/1971 | Jelinek | 277/180 |
| 3,986,721 | 10/1976 | Decker | 277/180 X |
| 4,026,565 | 5/1977 | Jelinek | 277/180 |
| 4,168,852 | 9/1979 | Ahlstone | 285/336 |
| 4,294,477 | 10/1981 | Ahlstone | 277/180 X |
| 4,303,251 | 12/1981 | Harra et al. | 277/236 |
| 4,407,516 | 10/1983 | Le et al. | 285/917 X |
| 4,616,860 | 10/1986 | Faria et al. | 277/167.5 X |
| 4,674,756 | 6/1987 | Fallon et al. | 277/180 X |
| 4,854,597 | 8/1989 | Leigh | 277/236 X |
| 5,040,714 | 8/1991 | McManigal | 277/236 X |
| 5,087,085 | 2/1992 | McGarvey | 285/917 X |
| 5,129,688 | 7/1992 | McGarvey | 285/328 |
| 5,135,269 | 8/1992 | Babuder | 285/917 X |
| 5,145,219 | 9/1992 | Babuder | 277/236 X |
| 5,163,721 | 11/1992 | Babuder | 285/917 X |

FOREIGN PATENT DOCUMENTS

| | | | |
|---|---|---|---|
| 0003495 | 4/1989 | PCT Int'l Appl. | 285/917 |
| 0393855 | 11/1965 | Switzerland | 277/180 |
| 0374479 | 3/1973 | U.S.S.R. | 285/917 |
| 0926789 | 5/1963 | United Kingdom | 277/180 |

Primary Examiner—Thomas B. Will
Assistant Examiner—James K. Folker
Attorney, Agent, or Firm—Lane, Aitken & McCann

[57] ABSTRACT

A fitting particularly suited for use in an ultraclean environment or a very clean room. The fitting consists of tubular members or glands having annular sealing beads which project from concentric radial sidewalls and a gasket. The sealing beads engage the gasket to form a seal and radial sidewalls engage the gasket to prevent overtightening of the fitting components.

9 Claims, 3 Drawing Sheets

FITTING WITH OVERTIGHTENING PREVENTION GASKET

BACKGROUND OF THE INVENTION

This invention relates to a tube coupling and, more particularly, to a face seal tube coupling used in an ultraclean environment.

There are many different fittings available which can join together glands or conduits. One fitting that has proven to be successful in ultraclean environments or very clean rooms ("VCR's") employs a metal gasket in combination with annular sealing beads which project from the ends of tubular members. U.S. Pat. No. 4,854,557 to Leigh and U.S. Pat. No. 4,838,583 to Babuder generally disclose the use of gaskets in face seal fittings between tubular members having annular sealing beads which project in an axial direction from the radial sidewalls. Minimizing the incidence of particulate matter is particularly important in industries such as semiconductor manufacturing and a number of different fittings have been designed for these special applications. Fittings required for applications in ultraclean environments or VCR's have been specifically designed to join tubular members in a manner that minimized the introduction of particulate matter. One successful design involved the modification of a fitting using annular beads and is directed at the reduction of the void spaces or crevices formed between the non-sealing surfaces of the gasket and the radial endwalls of the tubular members. These fittings, known as dead zero volume fittings, reduce the size of voids and, thus, the ability of particulate matter flowing through the fitting to become trapped in voids which could later be abruptly released and cause a high concentration of particulate matter to be introduced into the ultraclean environment.

Other fittings which have been designed for VCR applications attempt to control the position of the components of the fittings as they are drawn together so as to reduce the friction between the sealing surfaces of the tubular members and the sealing surface of the face gasket. It is believed that friction and excess pressure between the sealing elements from forces applied to the gasket can cause scratches or other deformation in the sealing surfaces which contributes to the introduction of undesirable particulate matter. Since the optimal level of particulate matter in such environments is zero, any manner in which the introduction of particulate matter is reduced is a desirable development. The improvements in face seal fittings which have been developed for VCR applications still were subject to limitations. When these fittings were refined to reduce the dead zero volume, the sealing area was reduced. As disclosed in the copending application of McGarvey, Ser. No. 07/652,225, the modification of the semicircular sealing beads in a conventional face seal fitting provided an arcuate exterior profile of the sealing bead with a reduced area available to form a seal. A modified gasket with a beveled face was also disclosed which was designed to engage the new sealing bead structure. The new fitting reduced the available surface area which formed the seal and correspondingly the unit force to surface area or pounds per square inch of pressure on the components increased.

In fittings employing the new designs, it was sometimes only possible to disassemble or reassemble the joints a limited number of times before either the gasket or tubular members would deform to such an extent that the components could no longer form a seal. It has been discovered that when the components are assembled, the parts are often tightened to an unnecessary degree. Overtightening problems were exacerbated in those fittings with reduced sealing surface area. In those fittings, it is difficult to determine with precision the point at which the tubular members and gasket form a satisfactory seal and, as a result, an assembler will continue to tighten the components after a satisfactory seal is formed to ensure a seal is achieved.

After a satisfactory seal is achieved, further rotation of the coupling nuts forces the tubular members to continue to be drawn together and into the gasket. This continued pressure on the components further deforms the sealing surfaces to an extent beyond the elastic limits of the metal which the components are comprised. Deformation to this extent is a suspected source of undesirable particulate matter. The deformation also shortens the effective life of the components because the surfaces are needlessly worn and becomes permanently deformed. Worn or deformed parts will not continue to make an effective seal upon repeated assembly. Overtightening of the gasket results in a shorter life of the sealing surface components because the components will permanently deform and wear at a faster rate. Overtightening is also suspected to be a source of particulate matter because extreme deformation of the components may release microscopic metal fragments into the systems. Overtightening of the seal can also put unnecessary stress upon other components of the fitting, such as the coupling bolt and tubular members thus accelerating fatigue of the entire assembly.

In fittings which employ other types of gaskets where overtightening was identified as a problem, simple spacers external to the gasket were employed or it was recommended that the assembler use a torque wrench. In the past, the problems associated with overtightening of face seal fittings were often simply ignored. Others attempted to achieve proper tightness by trial and error or crudely estimating how far to rotate the coupling nut beyond fingertight. In ultraclean environments, these imprecise methods to prevent overtightening proved to be unsatisfactory.

There is thus a need for a reliable and inexpensive solution that will effectively prevent the overtightening of face seal fittings. Improving the useable life of fittings typically used in ultraclean rooms is particularly desirable since many of the tubular elements are permanently welded into the systems thus making replacement a time consuming and expensive process. Effectively preventing overtightening will both extend the useful life of the components and minimize the incidence of particulate matter.

BRIEF SUMMARY OF THE INVENTION

The present invention is an improved gasket designed to be employed in face seal fittings which connect tubular elements having annular sealing rings and, more particularly, is directed to those fittings which employ modified sealing beads as described in the copending U.S. patent application Ser. No. 07/652,225 to McGarvey. The tubular elements define a conduit which carries gases such as helium and are suitable for use in ultraclean environments. The seal between the tubular members must prevent both leaks from and into the conduit. Like the gasket disclosed in the copending application, the improved gasket of the present invention is an annular ring having opposing beveled faces directed towards an axis through the tubular members. These beveled faces can engage the annular sealing beads which extend from the radial ends of the tubular members and form a seal. The region of the gasket with beveled faces connects a wider outer ring and a narrower inner ring which both have sidewalls perpendicular to an axis formed by the tubular members. The wider outer ring serves as a spacer which engages the radial sidewalls of the tubular members and limits axial movement of the gasket with respect to the sealing beads after a seal is formed.

The dimensions of the gasket are designed so the dimension of the beveled region in the axial direction is slightly less than the distance the annular sealing bead extends from the radial sidewalls of the tubular member. The radial length of the beveled region is approximately equal to the radius of the sealing bead. This design allows the metal which forms the seal to deform within its elastic limits while preventing excess axial movement of the tubular member after a seal is achieved by the engagement of the outer section the gasket with the radial sidewalls of the tubular member. Use of the spacing gasket according to the invention prevents overtightening of the fittings and increases the number of times seals can be made with the components.

BRIEF DESCRIPTION OF A PREFERRED EMBODIMENT

Figure 1:
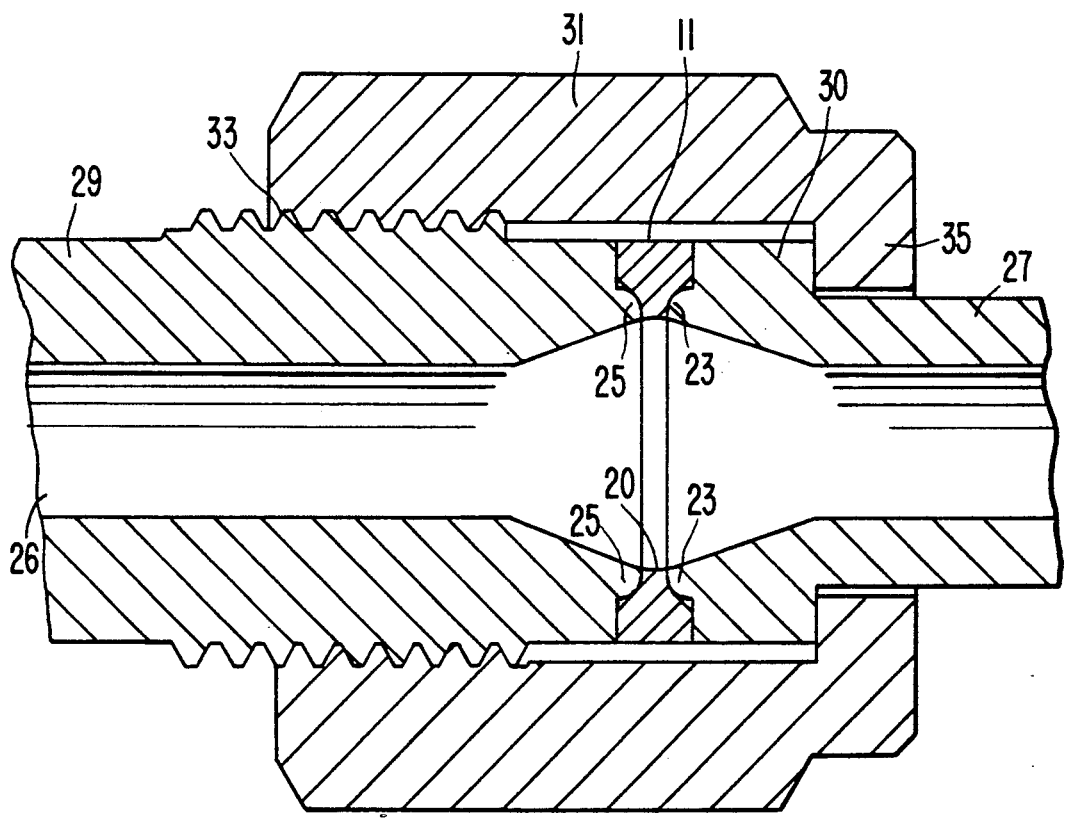
FIG. 1 is a cross section of a fitting employing a gasket according to the present invention.
Figure 3:
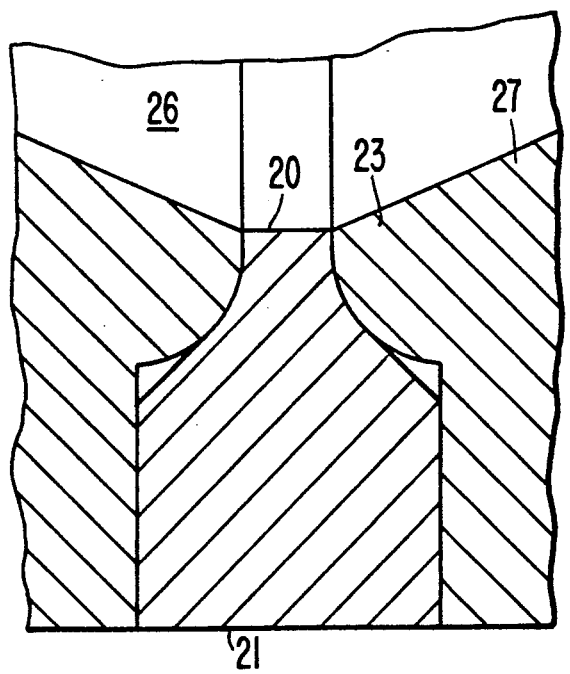
FIG. 3 is a cross section of a portion of the gasket of the invention and a tubular member having annular sealing beads shown in engagement.

As shown in FIG. 1, a gasket generally designated by the reference number 11 is designed to be employed in a face seal fitting between tubular members 27 and 29 which have annular sealing beads 23 and 25. The fitting shown in FIG. 1 employs sealing beads with an arcuate outer profile which are a modification of conventional fittings having semi-circular annular sealing beads. In cross section, the inner profile of the sealing beads 23 and 25 define the confines of a conduit 26 and outer arcuate profile engages the gasket 11. The engagement as depicted is what is known as a zero dead volume fitting because of the absence of any voids or space between the gasket and the ends of the tubular members 23 and 25. As best shown in FIG. 3, the conduit 26 defined by the interior surface of the tubular members 27 and 29 and the inner cylindrical wall 2; of the gasket 11 results in two conical surfaces meeting at the cylindrical surface 20 of the gasket. The resulting conduit wall is a continuous streamlined surface promoting laminar flow and is only interrupted by the slight seams between the gasket and the tubular members.

Figure 2:
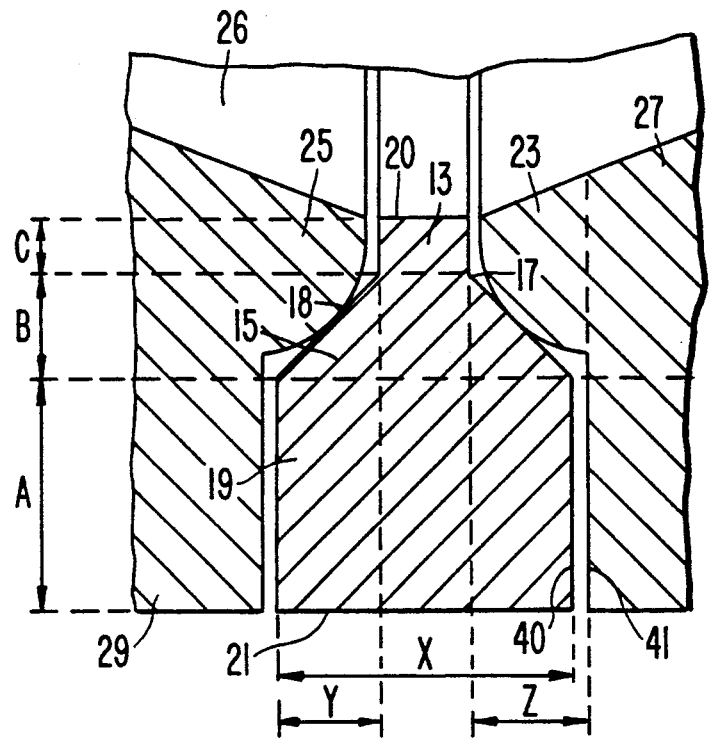
FIG. 2 is a cross section of the gasket of the present invention and a tubular member having annular sealing beads.

As best shown in FIG. 2, the gasket according to the invention is an annular ring having three distinct sections. A narrow inner section 13, a middle section 15 having beveled faces 17 and 18 and an outer wider section 19. The beveled faces 17 and 18 engage the annular sealing beads 23 and 25 to effect the seal. The outer section 19 serves as a spacer which limits the pressure that can be exerted on the sealing surfaces. An interior surface 20 which defines the channel and an exterior surface 21 of the gasket are both cylindrical. FIG. 2 shows a first embodiment of the invention at the point at which the sealing beads first contact the beveled faces of the gasket and before tightening. FIG. 3 shows the first embodiment after tightening and after seal has been satisfactorily achieved.

Figure 4:
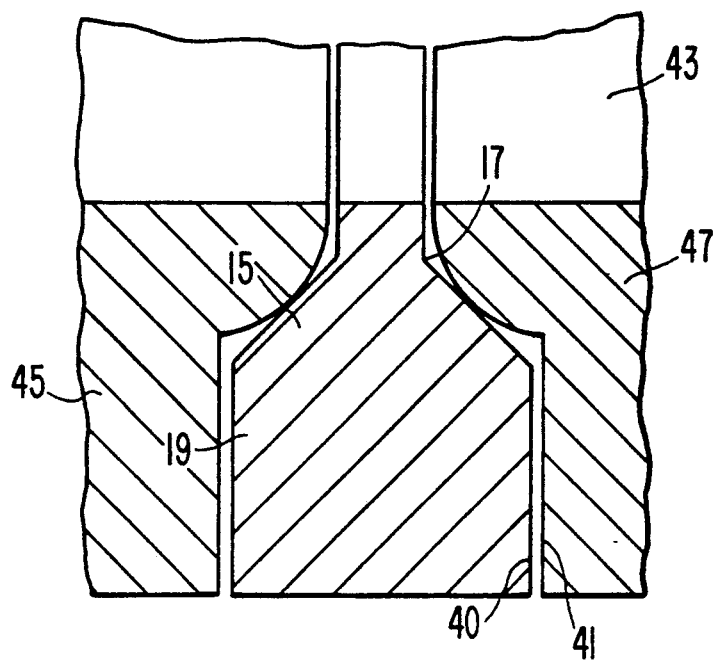
FIG. 4 is a cross section of a second embodiment of the invention before a seal is achieved.
Figure 5:
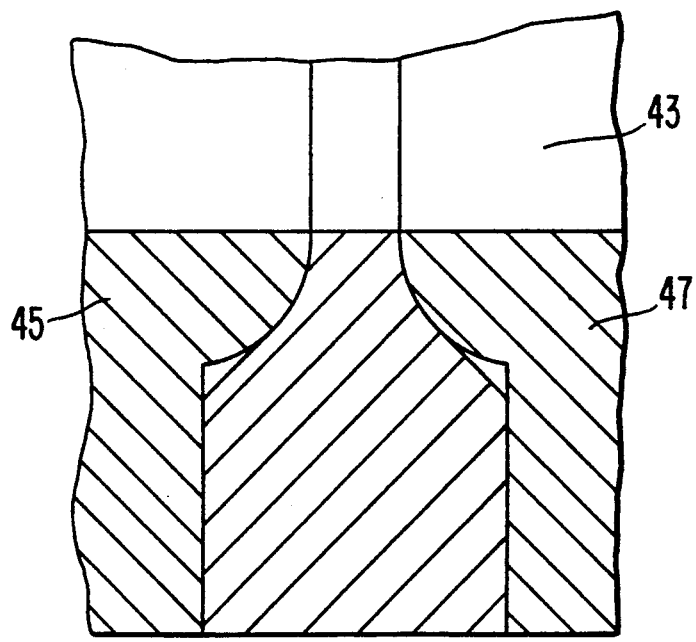
FIG. 5 is a cross section of the embodiment depicted in FIG. 4 shown in engagement.

FIG. 4 and FIG. 5 show a second embodiment of the invention before and after a seal is achieved. In this embodiment, the interior walls 43 of the tubular members 45 and 47 are in axial alignment and the circumference of the conduit formed by the gasket and tubular members is equal throughout the fitting. When the components are tightened as shown in FIG. 5, the conduit is defined by a substantially continuous cylindrical surface.

As best shown in FIG. 1, the tubular members 27 and 29 are drawn together by turning a coupling nut 31. The rotation of the coupling nut 31 causes a seat 35 to engage an integral tubular flange member 30. As the tubes are drawn together, gasket 11 is sandwiched between the ends of the tubular members 27 and 29. When the nut 31 is turned and the tubular members are drawn together, the annular sealing beads 23 and 25 which project from the ends of the tubular members 27 and 29, respectively, engage the beveled faces 17 and 18 of gasket 11. Continued rotation of the coupling nut draws the members closer together and causes the pressure on the components of the fitting to increase. The metal which makes up the sealing beads and gasket is slightly malleable which facilitates the formation of an helium-tight seal. As best shown in FIG. 2, as each sealing bead engages the beveled face 17 of gasket 11, it exerts a force on the gasket having both an axial and a radial component. Because the face is beveled, the radial force components tends tend to push the gasket outward as a reactive force tends to force the sealing bead inwardly towards the conduit 26 formed by the tubular members. The radial force also ensures an even distribution of pressure around the entire seal. As the sealing bead and the beveled force come together, the surfaces of the components which make up the seal also tend to slightly deform as a consequence of the pressure exerted at the point of the seal as shown in exaggeration in FIG. 3. Slight deformation is required to achieve the seal and is advantageous because the metal will fill any void spaces. Upon disassembly, the beads will return to their unstressed shapes.

In the fitting which employs the improved gasket of the invention, after formation of the seal, the radial sidewalls 40 of the outer section 19 of the gasket will engage the radial sidewalls 41 of the tubular element. When these flat surfaces meet, further axial movement of the tubular members 27 and 29 with respect to the gasket is prevented and deformation beyond the elastic limits of the sealing beads 23 and 25 is prevented. The assembler can easily sense the point when the two radial sidewalls meet because the resistance on the coupling nut 31 will quickly and severely increase.

In order for the improved gasket assembly to function efficiently, the dimensions of the gasket should be precisely constructed with respect to the annular sealing beads on the tubular member. As shown in FIG. 2, the distance between the radial sidewalls of the outer section of the gasket have a constant axial dimension and its radial faces are planar and perpendicular to an axis through the conduit. The inner circumference of the outer section should be equal or greater than the outer circumference of the annular sealing bead. The middle beveled face section which extends inwardly and axially meets an inner section 13 which has a narrower and uniform axial dimension. Inner section 13, like outer section 19, has radial sidewalls perpendicular to an axis through the conduit. The axial distance Y between the inner section's radial sidewall and the outer section's radial sidewall is slightly less than the distance Z defined by the distance which the sealing bead 23 extends axially from the radial sidewall 41 of tubular element 27. When sidewall 40 of the gasket's radial outer section meets the sidewall 47 of the tubular member 27, further axial movement bringing the components together is prevented.

The foregoing description is of a preferred embodiment of the present invention and modification may be made thereto with departing from the spirit and scope of the present invention, which is defined in the appended claims.

I claim:

1. A face seal fitting comprising a gasket and at least one tubular member, said tubular member having an annular sealing bead projecting form a radial end wall of said tubular member, said gasket having an inner beveled section defining an annular beveled surface facing toward an axis of said gasket and an outer section, said inner beveled surface being arranged to engage said sealing bead and form a seal, and an axial cross section of the annular sealing bead has an arcuate outer profile shaped to engage said beveled surface and a rectilinear inner profile defining an open passageway within said tubular member adjacent to said gasket, said outer section having an axial dimension which limits compression of said sealing bead beyond its elastic limits by engagement with said radial end wall, the axial depth of said beveled surface being selected to correspond to the axial dimension of said bead so that no space is left between the radially inner side of said gasket and said rectilinear profile when said axial outer section engages said radial end wall.

2. A fitting as recited in claim 1, wherein said gasket and said sealing bead are comprised of metal.

3. A face seal fitting as recited in claim 1, wherein the inner wall of said tubular member is flared outwardly to have a conical inner wall extending to said annular sealing beads and wherein said rectilinear inner profile is aligned with and forms part of said conical inner wall.

4. A fitting as recited in claim 1, wherein said arcuate outer profile extends through approximately a 90 degree angle from said rectilinear profile to said radial end wall.

5. A face seal fitting as recited in claim 1, wherein the inner circumference of said outer section is equal to or greater than the outer circumference of said annular sealing bead.

6. A face seal fitting comprising a gasket and tubular members having radial endwalls with integral sealing beads, said gasket comprising an inner section with an inner cylindrical wall defining a circular opening and radial sidewalls perpendicular to an axis through a conduit defined by said tubular members and said cylindrical wall, a middle section extending radially from said inner section having opposed beveled sidewalls facing toward said axis and engaged by said sealing beads, and a third outer section having radial sidewalls and an outer cylindrical wall, said outer section having an axial dimension which limits the axial movement of said gasket with respect to said tubular members to a predetermined distance, said distance being less than the amount which would cause one of said sealing beads to be stressed beyond its elastic limit, and each said integral sealing bead having in axial cross section an arcuate outer profile engaging said beveled sidewalls and a rectilinear inner profile defining an open passageway adjacent to said gasket within one of said tubular members, the axial distances from the sidewalls of the inner section to the sidewalls of the outer section on the same side of the gasket being selected to correspond to the axial dimensions of said beads so that no space is left between said inner cylindrical wall of said gasket and each said rectilinear profile when said outer section of said gasket limits axial movement of said gasket with respect to said tubular members to said predetermined distance.

7. A fitting as recited in claim 6, wherein elastic deformation of said bead and said gasket causes the material of said bead and to fill voids between said bead and said gasket at the intersections of said beveled surfaces and the radial sidewalls of said inner section.

8. A face seal fitting as recited in claim 6, wherein the axial distances from the radial sidewalls of said inner section and the radial side wall of said outer section on the same side of said gasket are slightly less than the distances that said sealing beads extend from said radial endwalls of said tubular members.

9. A face seal fitting comprising two tubular members, each said member having radial end walls and an annular sealing bead extending from said end walls, a gasket comprising an inner section having beveled faces surrounded by an outer section, said beveled faces facing toward an axis of said gasket and arranged to engage said sealing beads and effect a seal, said outer section having an axial dimension to engage said radial end walls of said tubular member, each said integral sealing bead having in axial cross section a convex arcuate outer profile engaging said beveled faces and a rectilinear inner profile defining an open passageway adjacent to said gasket within one of said tubular members, the axial dimensions of the bead being selected to correspond to the axial depth of said beveled faces so that no space is left between the radially inner side of said gasket and each said rectilinear profile when said outer section of said gasket engages said radial end walls of said tubular member.

* * * * *

UNITED STATES PATENT AND TRADEMARK OFFICE
CERTIFICATE OF CORRECTION

PATENT NO. : 5,222,747
DATED : June 29, 1993
INVENTOR(S) : Raymond McGarvey

It is certified that error appears in the above-identified patent and that said Letters Patent is hereby corrected as shown below:

```
Column 3, line 59, change "2;" to --21--.

Column 5, claim 1, line 27, change "form" to --from--.
```

Signed and Sealed this

Nineteenth Day of April, 1994

Attest:

BRUCE LEHMAN

Attesting Officer

Commissioner of Patents and Trademarks